(12) United States Patent
Ljung (10) Patent No.: US 11,363,413 B2
(45) Date of Patent: Jun. 14, 2022

(54) EFFICIENT UE LOCATION REPORTING IN CELLULAR NETWORKS

(71) Applicant: Sony Corporation, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/651,320

(22) PCT Filed: Oct. 1, 2018

(86) PCT No.: PCT/EP2018/076653
§ 371 (c)(1),
(2) Date: Mar. 26, 2020

(87) PCT Pub. No.: WO2019/063842
PCT Pub. Date: Apr. 4, 2019

(65) Prior Publication Data
US 2020/0245100 A1    Jul. 30, 2020

(30) Foreign Application Priority Data

Sep. 29, 2017    (SE) .................................. 1730267-0

(51) Int. Cl.
*H04W 24/00* (2009.01)
*H04W 4/029* (2018.01)
*H04W 72/04* (2009.01)

(52) U.S. Cl.
CPC ....... *H04W 4/029* (2018.02); *H04W 72/0406* (2013.01)

(58) Field of Classification Search
CPC ......... H04W 4/02; H04W 4/14; H04W 48/04; H04W 64/00

(Continued)

(56) References Cited

U.S. PATENT DOCUMENTS 8,150,397 B2 * 4/2012 Khetawat .......... H04W 12/1202
455/436
2005/0271031 A1 * 12/2005 Cho .................. H04W 72/1284
370/349

(Continued)

FOREIGN PATENT DOCUMENTS

CN    101213772 A    7/2008
CN    102883270 A    1/2013

(Continued)

OTHER PUBLICATIONS

International Search Report and Written Opinion from corresponding International Application No. PCT/EP2018/076653, dated Jan. 9, 2019, 11 pages.

(Continued)

*Primary Examiner* — Matthew W Genack
(74) *Attorney, Agent, or Firm* — Tucker Ellis LLP (57) ABSTRACT

A method (10) comprises communicating (11), from a network node (40) of a cellular network to a user equipment, UE, device (30), a first control signal (12) defining repetitive communicating (13) of a location information of the UE device (30) by the UE device (30); and in response to the communicating (11), repetitively communicating (13), from the UE device (30) to the network node (40), a second control signal (14) comprising the location information of the UE device (30). A user equipment, UE, device (30) and a network node (40) are configured to perform the method (10). A system (50) comprises the UE device (30) and the network node (40).

20 Claims, 9 Drawing Sheets

(58) Field of Classification Search
USPC .............................. 455/456.1–0.6, 457, 466
See application file for complete search history.

(56) References Cited

U.S. PATENT DOCUMENTS

| | | | |
|---|---|---|---|
| 2008/0039203 A1* | 2/2008 | Ackley | A63F 13/332 |
| | | | 463/40 |
| 2010/0056175 A1* | 3/2010 | Bachmann | H04W 8/08 |
| | | | 455/456.1 |
| 2010/0227627 A1 | 9/2010 | Ishii | |
| 2011/0294507 A1* | 12/2011 | Takagi | H04W 8/02 |
| | | | 455/435.1 |
| 2015/0223232 A1* | 8/2015 | Eriksson | H04W 72/0446 |
| | | | 370/329 |
| 2019/0281580 A1* | 9/2019 | Rune | H04L 27/2605 |

FOREIGN PATENT DOCUMENTS

| | | |
|---|---|---|
| CN | 106471861 A | 3/2017 |
| CN | 106792519 A | 5/2017 |
| EP | 2187665 A1 | 5/2010 |
| EP | 2547127 A1 | 1/2013 |
| JP | 2002209247 A | 7/2002 |
| JP | 2003116167 A | 4/2003 |
| JP | 2003219455 A | 7/2003 |
| JP | 2007088772 A | 4/2007 |
| JP | 2007325276 A | 12/2007 |
| JP | 2011019227 A | 1/2011 |
| JP | 2012244630 A | 12/2012 |
| WO | 2009028209 A1 | 3/2009 |
| WO | 2012050492 A1 | 4/2012 |
| WO | 2013172758 A1 | 11/2013 |
| WO | 2014010787 A1 | 1/2014 |

OTHER PUBLICATIONS

Qualcomm Incorporated: "Broadcast of positioning assistance data", 3GPP TSG-RAN WG2 #71, R2-104698, Aug. 23-27, 2010.

Sesia, Stefania et al., "LTE the UMTS Long Term Evolution From Theory to Practice", Second Edition, Wiley, 2011.

3GPP TS 36.355 V14.2.0: "Technical Specification Group Radio Access Network; Evolved Universal Terrestrial Radio Access (E-UTRA); LTE Positional Protocol (LPP) (Release 14)", 3rd Generation Project (3GGP); dated Jun. 2017, 167 pages.

* cited by examiner

EFFICIENT UE LOCATION REPORTING IN CELLULAR NETWORKS

FIELD OF THE INVENTION

The invention relates to a method of reporting of terminal locations in cellular networks, to a corresponding terminal and a corresponding network node respectively configured to perform the method, and to a corresponding system comprising the terminal and the network node.

BACKGROUND OF THE INVENTION

In wireless networks, tracking terminals' geographic location is fundamental for providing a variety of services, in particular location-based services, or in Internet of Things (IoT) contexts.

Firstly, this involves the terminal measuring its position, for example via network-based positioning, for example by triangulation of LTE radio signals, or via Global Navigation Satellite System (GNSS)-based positioning. Secondly, the network has to locate the terminal, i.e. obtain the measured position.

In an "over the top" approach, for example, the terminal may disclose its measured position to an Internet-based location server. This may involve higher-layer protocols, for example on an application layer or transport layer, such as TCP/IP for flow control, TLS for privacy and the like, and entail excess signaling and excess power consumption of the terminal, as the terminal may need to remain active until the server has responded accordingly.

Alternatively, the terminal may disclose its measured position to a location server of the wireless network, in response to a corresponding location request by this server. In LTE networks, this may be achieved via 3GPP control plane protocols such as the LTE Positioning Protocol, LPP, on the Non-Access Stratum, NAS, of the LTE network.

3GPP Technical Specification 24.171 version 14.0.0 as of March 2017 defines two such approaches known as "Network-initiated positioning information transport" as well as "Mobile-originated location request", depending upon whether the network or the terminal initiates the location request by the server.

Evidently, for a solution targeting efficient network signaling and low energy consumption, 3GPP-based approaches are superior to over the top solutions, due to less overhead in the involved signaling procedures. Nevertheless, a signaling load and terminal power consumption is still considerable.

BRIEF SUMMARY OF THE INVENTION

In view of the above, there is a continued need in the art for efficient location reporting of terminals which addresses some of the above needs.

There is in particular a need in the art for a corresponding method involving less signaling and less power consumption of terminals. There is also a need in the art for corresponding terminal devices and network nodes configured to perform the method, as well as for corresponding systems comprising such terminal devices and network nodes.

These underlying objects of the invention are each solved by the features of the independent claims. Preferred embodiments of the invention are set forth in the dependent claims.

According to a first aspect, a method is provided. The method comprises communicating, from a network node of a cellular network to a user equipment, UE, device, a first control signal defining repetitive communicating of a location information of the UE device by the UE device; and in response to the communicating, repetitively communicating, from the UE device to the network node, a second control signal comprising the location information of the UE device.

The phrase "communicating" as used herein refers to either "transmitting" or "receiving". In other words, the role of a communication endpoint as a "transmitter" or "receiver" depends on a direction of the communication. For example, in a communication from A to B, endpoint A would be considered "transmitting" and endpoint B "receiving". In a communication in reverse direction B to A, endpoint B would be "transmitting" and endpoint A "receiving".

The phrase "repetitive(ly) communicating" as used herein refers to a communication characterized by repetition. In other words, a particular communication is performed a plurality of times, resulting in a plurality of respective communications (or communication acts).

A cellular network is a communication network which serves a plurality of mobile terminals via wireless connectivity provided by a plurality of cells, which are organized according to a spatial frequency assignment. Communication with such a mobile terminal requires the terminal to attach to a particular cell and to use frequency resources of that serving cell.

A user equipment, UE, device as used herein refers to any terminal equipped with mobile broadband adapters and used directly by an end-user to communicate in a radio access network. Examples of such networks could be Universal Mobile Telecommunications System, UMTS, and 3GPP Long Term Evolution, LTE, cellular networks, New Radio, NR, 5G networks, Long Range radio, LoRa, etc. For example, smartphones, computers, Narrowband Internet of Things (NB-IoT) devices or any other devices may represent UE devices.

A location information as used herein refers to a set of geographic coordinates defining a particular geographic location. For example, location information may comprise latitude and longitude information, optionally altitude information, and may be represented as decimal degrees, as degrees-minutes-seconds, or in any other representation.

Additionally, the location information may further comprise an indication of an accuracy of the latitude, longitude and/or altitude information, and/or an indication of an age of the latitude, longitude and/or altitude information.

Advantageously, the method further reduces a control signalling overhead with respect to known standardized approaches of location reporting of terminals. It does so by generating a plurality of second control signals, i.e. location reports, using only a single instance of a first control signal, i.e. a location request. In other words, the method reduces a relation between a number of location requests and a number of location reports from N/N to 1/N.

According to some embodiments, the method comprises, in response to the communicating, repetitively communicating, from the UE device to the network node and via a further network node, a second control signal comprising the location information of the UE device.

According to some embodiments, a respective communicating of the repetitive communicating is triggered by a trigger event of a respective tracking area update, TAU, procedure of a plurality of TAU procedures initiated by the UE device.

A tracking area update, TAU, procedure as used herein refers to a control signaling procedure performed in a cellular network. As one example this procedure could be between a UE device in idle state and a Mobility Management Entity, MME, of a LTE cellular network to keep the cellular network informed of a changing location of the UE device within the cellular network on a coarse level, so that the cellular network roughly knows where to page the UE device if need be, even though the UE device is non actively participating in any communication. Since a TAU procedure typically is performed with a repetitive pattern, e.g. when a timer value expires, the TAU procedure can also be used by the network to determine that the UE device is still available in the network, meaning e.g. that the UE still is powered and still has a capability to communicate.

A TAU procedure as used herein could also refer to a similar control signaling procedure in other radio access technologies than LTE. For example, a TAU procedure could herein refer to a repeated status update procedure from the UE device to a network node in the 3GPP NR specifications. A TAU procedure could further refer to a repeated UE status update message in other radio access technologies where one or more UE devices are connecting to a network node.

Advantageously, the method further reduces a signalling overhead with respect to known standardized approaches of location reporting of terminals. It does so by guiding the second control signal via a further network node. Frequent control signaling between this further network node and the UE device is already present, and is carried out on a lower communication layer as compared to the control signaling between the network node and the UE device. Re-using the control signaling on the lower communication layer for location reporting results in less power consumption of the UE device as well as of the involved node of the network.

For example, in an LTE network, the further network node may be an MME and the essential control signaling between the UE device and the MME may be related to TAU procedures initiated by the UE device.

According to some embodiments, the respective communicating is triggered by a trigger event of a respective TAU procedure of a subset of the plurality of TAU procedures initiated by the UE device.

According to some embodiments, the repetitive communicating is carried out in accordance with a predetermined frequency of occurrence.

According to some embodiments, the first control signal defining the repetitive communicating comprises the predetermined frequency of occurrence.

Advantageously, the method further reduces a signalling overhead with respect to known standardized approaches of location reporting of terminals. It does so by generating second control signals, i.e. location reports, less frequently. In other words, only a subset of the plurality of TAU procedures initiated by the UE device results in a respective communicating of the repetitive communicating, i.e. in a location report being communicated to the network node.

For example, the predetermined frequency of occurrence may be represented as a positive integer value n>1 defining that a respective communicating of the second control signal, i.e. location report, may occur every $n^{th}$ TAU procedure.

According to some embodiments, the second control signal comprising the location information of the UE device is included in a third control signal initiating the respective TAU procedure.

In particular, the UE device may initiate a TAU procedure if the UE device detects that it has left its current tracking area, TA, i.e. a set of cells, registered with the cellular network. In that case, the UE device may transmit a third control signal, e.g. a TAU request, to the MME.

Advantageously, the method further reduces a signalling overhead with respect to known 3GPP-based approaches of location reporting of terminals. It does so by guiding the second control signal via a further network node. Frequent control signaling between this further network node and the UE device is already present, and is carried out on a lower communication layer as compared to the control signaling between the network node and the UE device. Re-using the control signaling on the lower communication layer for location reporting results in less signaling overhead, as then location reporting itself does not require any dedicated session management.

As the further network node, i.e. the MME, and the network node, i.e. the location server, are connected via a fixed network, forwarding the second control signal from the further network node to the network node is less critical and straightforward. This may, for example, involve receiving the third control signal at the further network node, decapsulating the second control signal from the third control signal, encapsulating the second control signal using address information of the network node, and forwarding the encapsulated second control signal to the network node.

According to some embodiments, the repetitive communicating is carried out a predetermined number of times.

According to some embodiments, the first control signal defining the repetitive communicating comprises the predetermined number of times.

According to some embodiments, the repetitive communicating is carried out for a predetermined time period or up to a predetermined time instant.

According to some embodiments, the first control signal defining the repetitive communicating comprises the predetermined time period or the predetermined time instant.

Advantageously, it may be specified once, in the first control signal, how often the respective communicating of the repetitive communicating should take place, and alternatively or in addition, how long the respective communicating of the repetitive communicating should take place in a time dimension. This minimizes corresponding provisions and contributes to a control of the repetitive communicating and thus to a control of the method which ultimately retains only a single first control signal, i.e. location request, for a plurality of second control signals, i.e. location reports.

For example, the predetermined number of times may be represented as an integer counter defining the number of second control signals to be communicated in response to the single first control signal. As another example, the predetermined time period or predetermined time instant may be represented as a time value defining a future point in time, either as a relative value in connection with a current network time, or as an absolute time value at which repetitively communicating of second control signals should cease.

According to some embodiments, the method further comprises operating the UE device in a disconnected state in which a data connection between the UE device and the cellular network has been released, or is considered as inactive. The repetitive communicating is carried out while operating the UE device in the disconnected state.

A disconnected state as used herein may refer to an operational state of an UE device in an LTE cellular network assuming a combination of EMM-REGISTERED and ECM-IDLE states.

A disconnected state as used herein may further refer to an operational state in an LTE or NR cellular network or other radio access network, where the UE device is considered to be in a radio resource control (RRC) wise inactive state.

The UE device enters the EMM-REGISTERED state by a successful registration with a radio access network, RAN, for example an E-UTRAN of an LTE cellular network. Therefore, in the LTE example, in the EMM-REGISTERED state, the UE location is known to the cellular network at least on a tracking area, TA, granularity. Furthermore, the UE device enters the ECM-IDLE state if its RRC connection is released. In other words, in the ECM-IDLE state, no control plane signalling connection between the UE device and the cellular network exists.

Still referring to the LTE example, in the disconnected state, i.e. in the particular combination of EMM-REGISTERED and ECM-IDLE states, the UE device shall initiate TAU procedures if deemed necessary by the UE device in order to maintain the registration and enable the MME to page the UE. Such initiation of TAU procedures may also be triggered by different events, such as, for example, a timer time-out.

Advantageously, repetitive communicating being carried out while operating the UE device in the disconnected state enables the UE device to provide its geographic position, which is usually more accurate than a TA information, although the UE device is not actively participating in any user plane communication and therefore making minimal use of network resources.

According to some embodiments, the first control signal defining the repetitive communicating comprises reoccurring resources allocated to the UE device for the repetitive communicating.

Advantageously, it may be specified once, in the first control signal, which resources are to be used by the UE device for the repetitive communicating. This minimizes corresponding provisions and contributes to a control of the repetitive communicating and thus to a control of the method which ultimately retains only a single first control signal, i.e. location request, for a plurality of second control signals, i.e. location reports.

For example, the reoccurring resources may relate to radio resources shared in frequency and/or time division multiple access to be used for the second control signals to be communicated in response to the single first control signal.

According to some embodiments, the communicating is carried out depending on a category of the UE device.

A UE device category as used herein refers to a combined uplink and downlink radio throughput capability. In other words, the UE device category relates to a particular data volume granted to the UE device.

Advantageously, this enables conditional execution of the communicating in dependence of the data volume granted to the UE device. For example, an operator of the cellular network may restrict the repetitive communicating based on a comparison of the data volume granted to the UE device with a data volume required for the repetitive communicating.

According to some embodiments, the communicating is carried out depending on a subscription information relating to the UE device.

Advantageously, this enables conditional execution of the communicating in dependence of the subscription information. For example, the operator of the cellular network may restrict the repetitive communicating based on aspects of the subscription, such as, for example, remuneration, data plan limits, and the like.

According to some embodiments, the method further comprises initiating, by another network node of the cellular network different from the network node, the communicating.

According to some embodiments, the method further comprises initiating, by the UE device, the communicating.

Advantageously, initiating the communicating by the network allows the network to retrieve second control signals comprising location reports as needed, as often as needed, and as long as needed. Similar considerations apply when initiating the communicating by the UE device itself, for example in a context of a location-based service which depends on accurate location information.

According to a second aspect, a user equipment, UE, device is provided. The UE device comprises a wireless interface; a memory; and a processor. The processor is configured to receive, from a network node of a cellular network, a first control signal defining repetitive transmitting of a location information of the UE device by the UE device; and in response to the receiving, repetitively transmit, to the network node, a second control signal comprising the location information of the UE device.

According to some embodiments, the UE device is configured to perform the method according to various embodiments.

Advantageously, the technical effects and advantages described above in relation with the method equally apply to the UE device having corresponding features.

According to a third aspect, a network node of a cellular network is provided. The network node comprises a network interface; a memory; and a processor. The processor is configured to transmit, to a user equipment, UE, device, a first control signal defining repetitive transmitting of a location information of the UE device by the UE device; and in response to the transmitting, repetitively receive, from the UE device, a second control signal comprising the location information of the UE device.

According to some embodiments, the network node is configured to perform the method according to various embodiments.

Advantageously, the technical effects and advantages described above in relation with the method equally apply to the network node having corresponding features.

According to a fourth aspect, a system is provided. The system comprises a user equipment, UE, device according to various embodiments, and a network node according to various embodiments.

Advantageously, the technical effects and advantages described above in relation with the method equally apply to the system having corresponding features by incorporating a UE device and a network node.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

Figure 1:
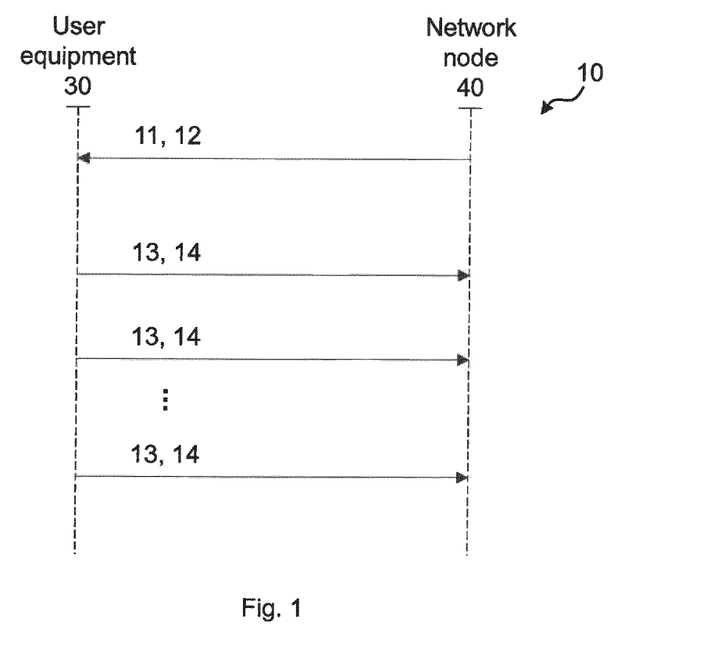
FIGS. 1-2 are schematic signaling diagrams illustrating a method according to embodiments.
Figure 2:
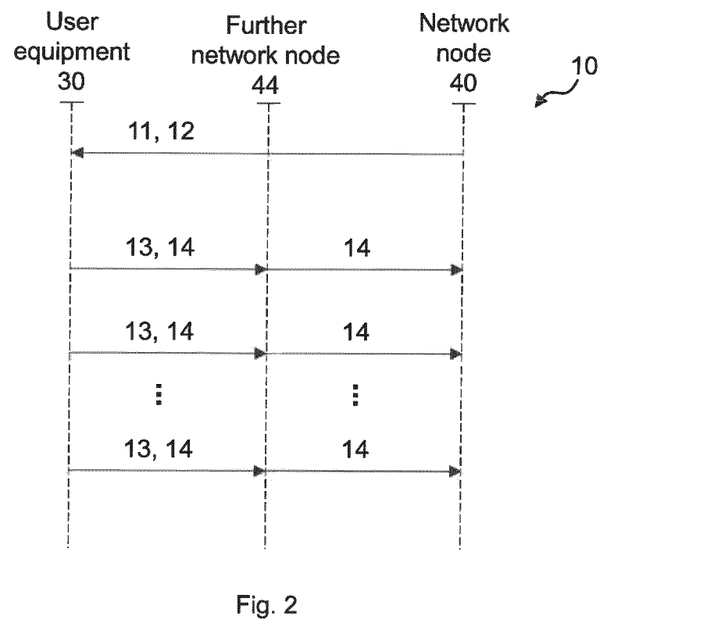

FIGS. 1-2 are schematic signaling diagrams illustrating a method 10 according to various embodiments.

With reference to FIG. 1, the method 10 is shown. Method 10 comprises a communicating 11 step and a repetitive communicating 13 step.

The first step involves communicating 11, from a network node 40 of a cellular network to a user equipment, UE, device 30, a first control signal 12 defining repetitive communicating 13 of a location information of the UE device 30 by the UE device 30.

In other words, the network node 40 transmits 11, to the UE device 30, and consequently the UE device 30 receives 11, from the network node 40, a first control signal 12 defining repetitive transmitting 13 of a location information of the UE device 30 by the UE device 30.

The first control signal 12 will be discussed in more detail in connection with FIG. 9 below.

The second step involves, in response to the communicating 11, repetitively communicating 13, from the UE device 30 to the network node 40, a second control signal 14 comprising the location information of the UE device 30.

To put it another way, the UE device repetitively transmits 13, to the network node 40, and in response to the receiving 11 from the network node 40, the second control signal 14 comprising the location information of the UE device 30.

Consequently, the network node 40 repetitively receives 13, from the UE device 30, and in response to the transmitting 11 to the UE device 30, the second control signal 14 comprising the location information of the UE device 30.

The second control signal 14 will be discussed in detail in association with FIG. 8 below.

In the embodiment of FIG. 1, the repetitive communicating 13 involves a plurality of respective repetitive communicating 13 steps, reflecting that one communicating 11 step including the first control signal 12 may induce a plurality of respective repetitive communicating 13 steps including the second control signal 14.

Making reference to FIG. 2, the method 10 is shown in more detail by illustrating a further network node 44 in addition.

In the embodiment of FIG. 2, the second step of method 10 involves, in response to the communicating 11, repetitively communicating 13, from the UE device 30 to the network node 40 and via the further network node 44, a second control signal 14 comprising the location information of the UE device 30.

In other terms, the UE device 30 repetitively transmits 13, to the network node 40, in response to the receiving 11 from the network node 40 and via the further network node 44, the second control signal 14 comprising the location information of the UE device 30.

Consequently, the network node 40 repetitively receives 13, from the UE device 30, in response to the transmitting 11 to the UE device 30 and via the further network node 44, the second control signal 14 comprising the location information of the UE device 30.

Accordingly, the UE device 30 repetitively transmits 13 the second control signal 14 to the further network node 44, from where the second control signal 14 is to be forwarded to the network node 40.

FIGS. 3-7 are cutouts of schematic signaling diagrams illustrating the method 10 according to various embodiments.

Figure 3:
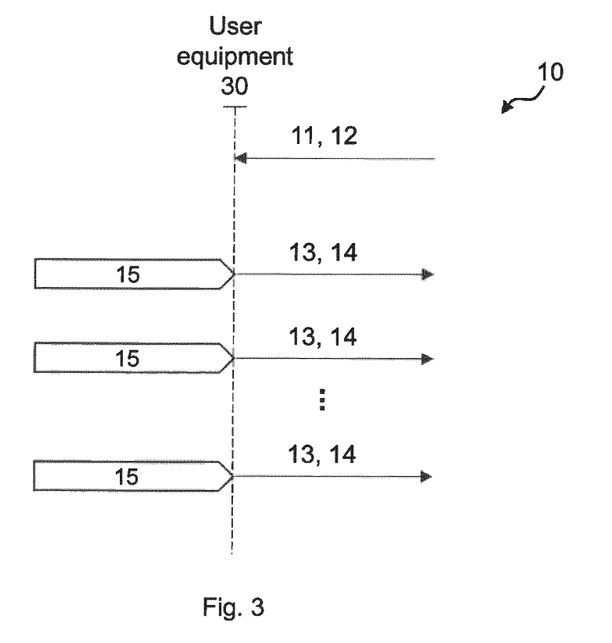
FIGS. 3-7 are cutouts of schematic signaling diagrams illustrating the method according to embodiments.

In the embodiment of FIG. 3, a plurality of trigger events 15 of respective tracking area update, TAU, procedures are shown incident to the UE device 30. The respective TAU procedures may be initiated by the UE device 30 for various reasons, for example as the UE device 30 detects it has entered a new tracking area, TA, of the cellular network, or a periodic TA update timer has expired. FIG. 3 shows that each respective repetitive communicating 13 is triggered by a trigger event 15 of a respective TAU procedure of the UE device.

Figure 4:
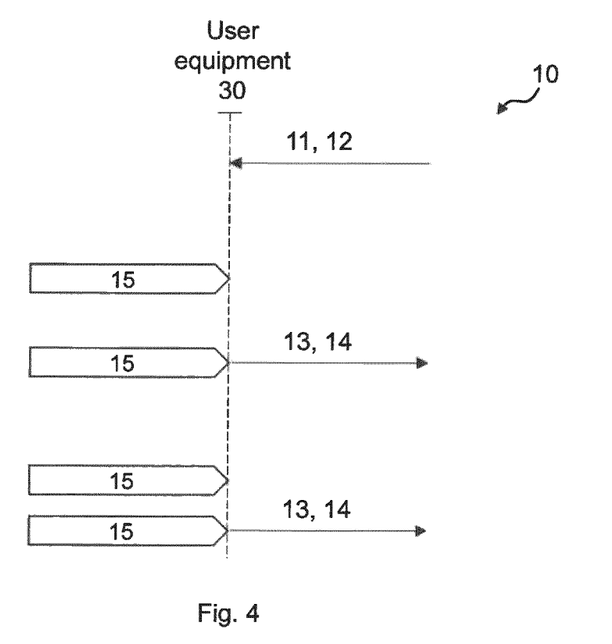

In the embodiment of FIG. 4, the respective communicating 13 is triggered by a trigger event 15 of a respective TAU procedure of a subset of the plurality of TAU procedures initiated by the UE device 30.

In other words, only a subset of the plurality of TAU procedures of the UE device 30 triggers a respective repetitive communicating 13 of the second control signal 14.

The subset of the plurality of TAU procedures which is supposed to trigger a respective repetitive communicating 13 may be defined, for example, using an approach discussed in more detail in connection with FIG. 9 below.

Figure 5:
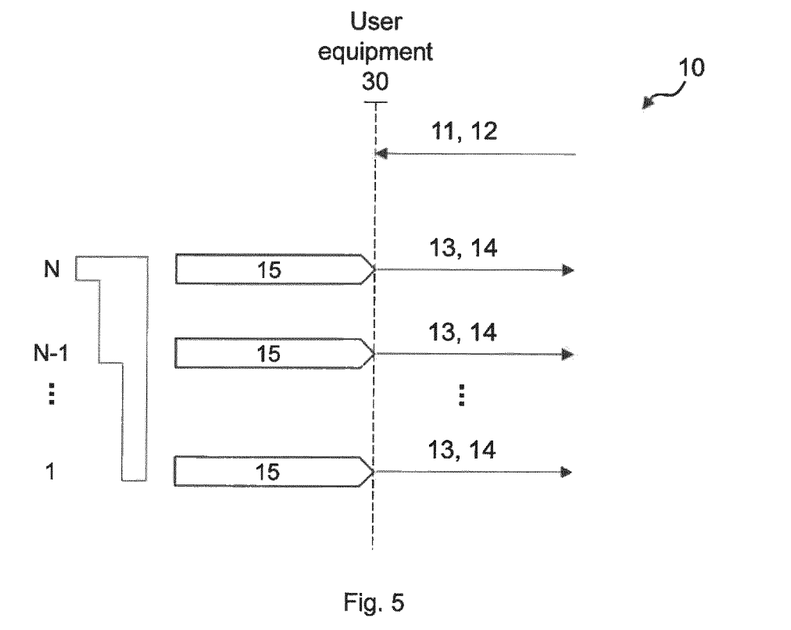

In the embodiment of FIG. 5, the repetitive communicating 13 is carried out a predetermined number of times 18. As an example, to the left of the trigger events 15, a countdown of an integer counter variable is indicated graphically by a vertical bar which becomes narrower upon each trigger event 15. A countdown to a non-positive value indicates that no further repetitive communicating 13 may be carried out. This enables an operator of the cellular network to impose an upper limit on an occurrence of the repetitive communicating 13.

Figure 6:
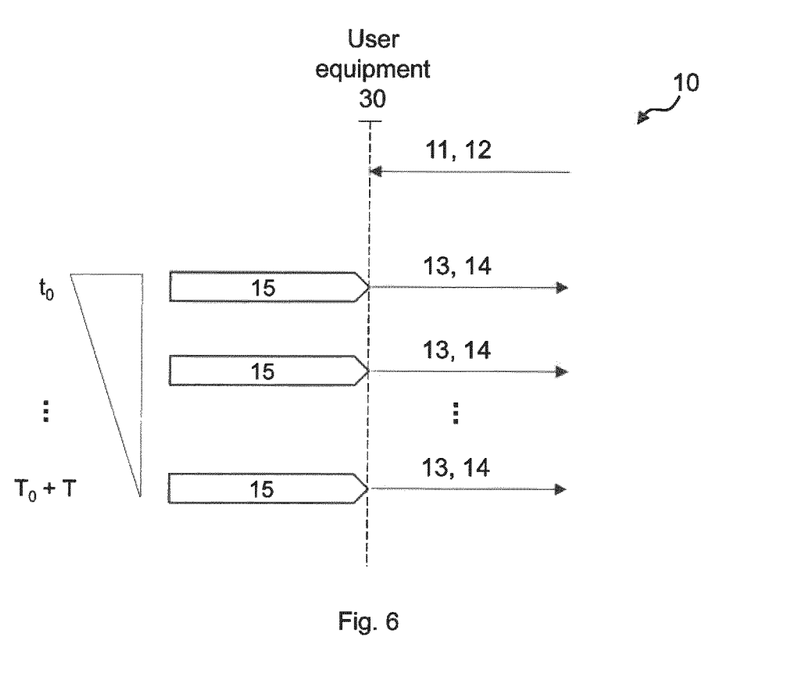

In the embodiment of FIG. 6, the repetitive communicating 13 is carried out for a predetermined time period 19 or up to a predetermined time instant 20. As an example, to the left of the trigger events 15, a countdown of a real number variable in accordance with time is indicated. A countdown to a non-positive value indicates that no further repetitive communicating 13 may be carried out. This enables the operator to impose, either in addition to the previous upper limit, or alternatively thereto, a further upper limit on a duration of execution of the repetitive communicating 13.

Figure 7:
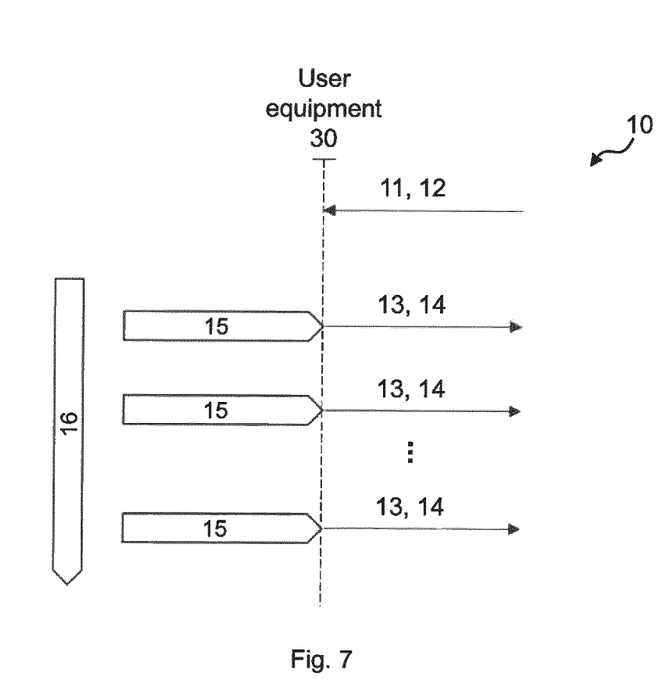

In the embodiment of FIG. 7, the method 10 comprises a further operating 16 step.

In this further step, the UE device 30 is operated 16 in a disconnected state in which a data connection between the UE device 30 and the cellular network has been released, and the repetitive communicating 13 is carried out while operating 16 the UE device 30 in the disconnected state. This enables the operator to receive location reports from the UE device 30 although it is not actively participating in any user plane communication.

Figure 8:
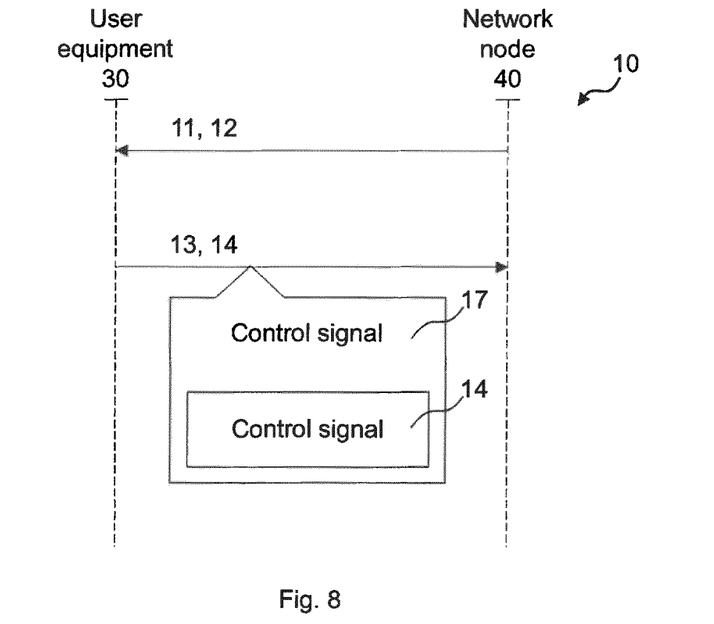
FIGS. 8-9 are schematic diagrams illustrating signaling content of the method according to embodiments.
Figure 9:
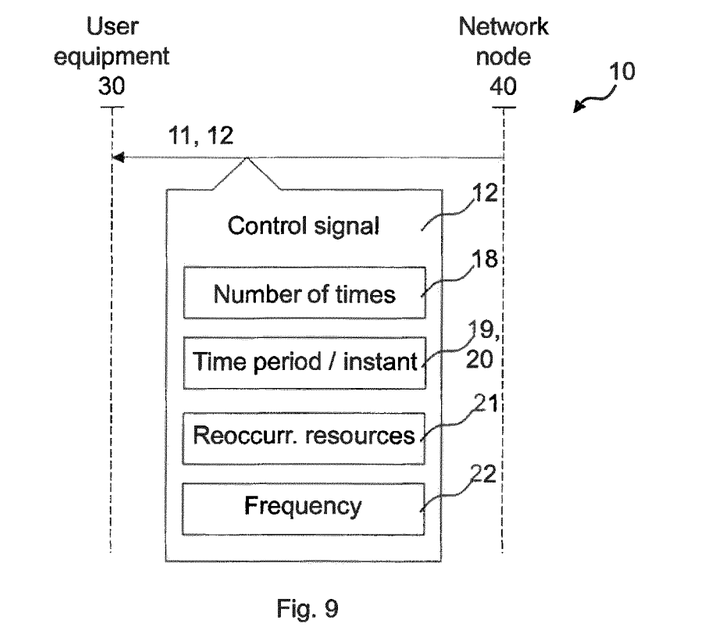

FIGS. 8-9 are schematic diagrams illustrating signaling content of the method 10 according to various embodiments.

In the embodiment of FIG. 8, the second control signal 14 comprising the location information of the UE device 30 is included in a third control signal 17 initiating the respective TAU procedure. For example, the third control signal 17 may be a TAU request message being transmitted from the UE device 30 to the cellular network and, in particular, to the further network node 44 (not shown) of the cellular network.

In the embodiment of FIG. 9, the first control signal 12 defining the repetitive communicating 13 is shown as comprising a number of information elements 18-22.

The first control signal 12 may comprise the predetermined number of times 18 the repetitive communicating 13 is to be carried out.

Alternatively or in addition, the first control signal 12 may comprise the predetermined time period 19 during which the repetitive communicating 13 is to be carried out, or the predetermined time instant 20 up to which the repetitive communicating 13 is to be carried out.

If the predetermined parameters 18, 19, and 20 are absent altogether, then the repetitive communicating 13 may be carried out until further notice, or may not be carried out at all, in accordance with operator preferences.

In addition, the first control signal 12 may comprise reoccurring resources 21 allocated to the UE device 30 for the repetitive communicating 13. In particular, the reoccurring resources 21 may relate to radio resources shared in frequency and/or time division multiple access.

In addition, the first control signal 12 may comprise a predetermined frequency of occurrence 22 in accordance with which the repetitive communicating is to be carried out. For example, the frequency of occurrence 22 may be defined as an integer value n>1 restricting the repetitive communicating 13 to every $n^{th}$ TAU procedure.

Figure 10:
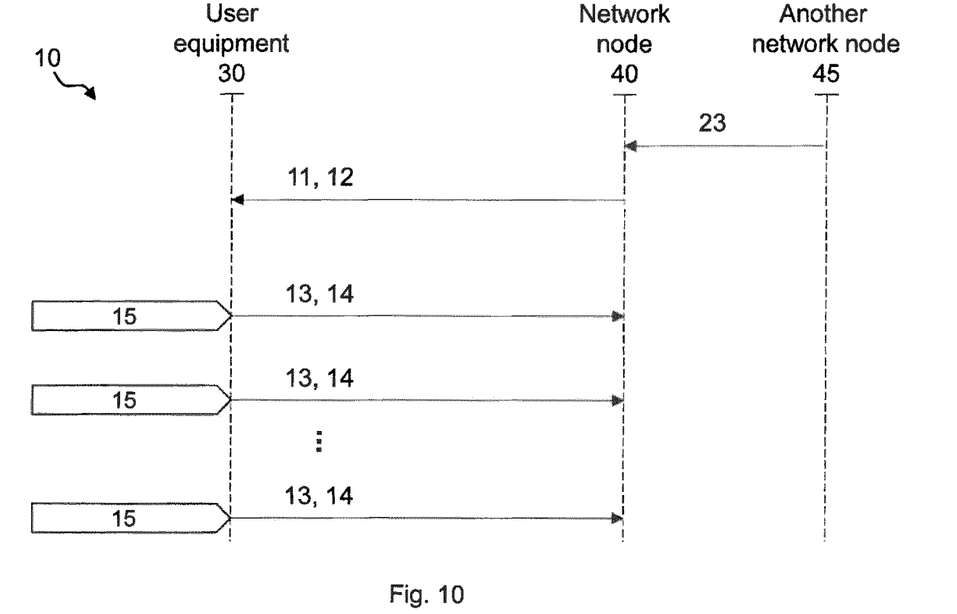
FIGS. 10-11 are schematic signaling diagrams illustrating the method according to various embodiments.
Figure 11:
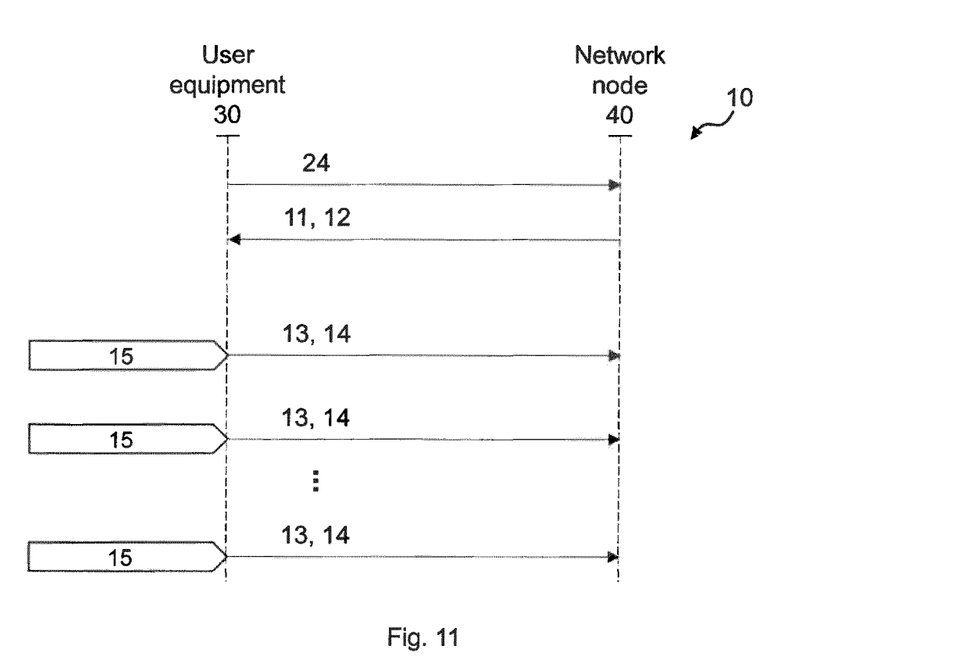

FIGS. 10-11 are schematic signaling diagrams illustrating the method 10 according to various embodiments.

In the embodiment of FIG. 10, method 10 further comprises initiating 23, by another network node 45 of the cellular network different from the network node 40, the communicating 11.

The further network node 40 may, in particular, be a location server 40 collecting and holding the location information of the UE device 30 on behalf of the cellular network. Therefore, any other network node 45 of the cellular network besides the location server 40 may potentially initiate 23 the communicating 11 in order to accurately track the UE device, not only on TA granularity but also in terms of a more accurate geographic position.

Alternatively or in addition, and according to the embodiment of FIG. 11, method 10 may further comprise initiating 24 the communicating 11 by the UE device 30.

Thus, also the UE device 30 may potentially initiate 24 the communicating 11 in order to provide its up-to-date location information and to be accurately tracked by the cellular network on the basis of more accurate geographic coordinates.

The initiating 23, 24 may have the same effect when incident at the network node 40, but may differ in terms of the respective composition owing to the underlying transmission technologies, and/or due to involvement of different communication protocols.

In the embodiments of FIGS. 10 and 11, the communicating 11 may be carried out depending on a category of the UE device 30, and/or depending on a subscription information relating to the UE device 30.

Figure 12:
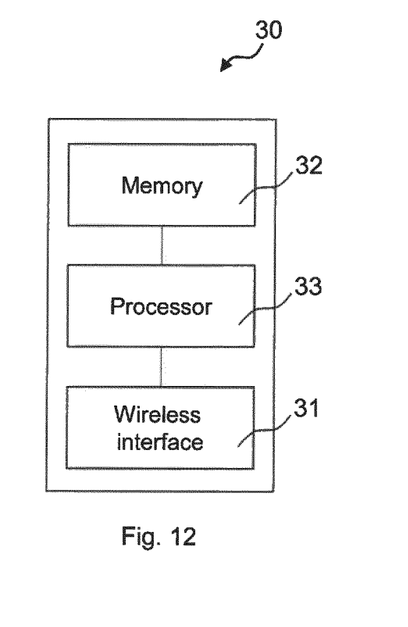
FIGS. 12-13 are schematic block diagrams respectively illustrating a UE device and a network node according to various embodiments.
Figure 13:
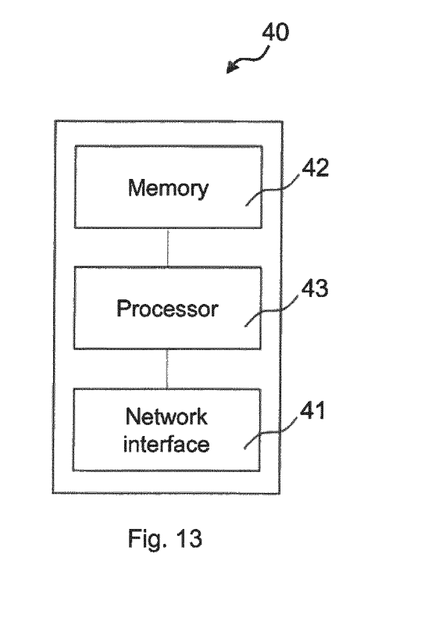

FIGS. 12-13 are schematic block diagrams respectively illustrating a UE device 30 and a network node 40 according to various embodiments.

In the embodiment of FIG. 12, a UE device 30 comprises a wireless interface 31; a memory 32; and a processor 33. In a first step, the processor 33 is configured to receive 11, from a network node 40 of a cellular network, a first control signal 12 defining repetitive transmitting 13 of a location information of the UE device 30 by the UE device 30. In a second step, the processor 33 is configured to repetitively transmit 13, to the network node 40 and in response to the receiving 11, a second control signal 14 comprising the location information of the UE device 30.

The UE device 30 may be configured to perform the method 10 according to various embodiments.

In the embodiment of FIG. 13, a network node 40 of a cellular network comprises a network interface 41; a memory 42; and a processor 43. In a first step, the processor 43 is configured to transmit 11, to the UE device 30, the first control signal 12 defining repetitive transmitting 13 of a location information of the UE device 30 by the UE device 30. In a second step, the processor 43 is configured to repetitively receive 13, from the UE device 30 and in response to the transmitting 11, the second control signal 14 comprising the location information of the UE device 30.

The network node 40 is, in particular, a location server 40, and may be configured to perform the method 10 according to various embodiments in order to collect and hold accurate location information of UE devices 30 on behalf of the cellular network.

The UE device 30 and the network node 40 may communicate 11 and repetitively communicate 13 with each other via one or more intermediate nodes, in particular a base station of the cellular network and a mobility management entity, MME, node 44 of the cellular network, which are arranged to convert the communicating 11 and the repetitively communicating 13 in terms of the underlying transmission technologies as well as in terms of the involved communication protocols.

Figure 14:
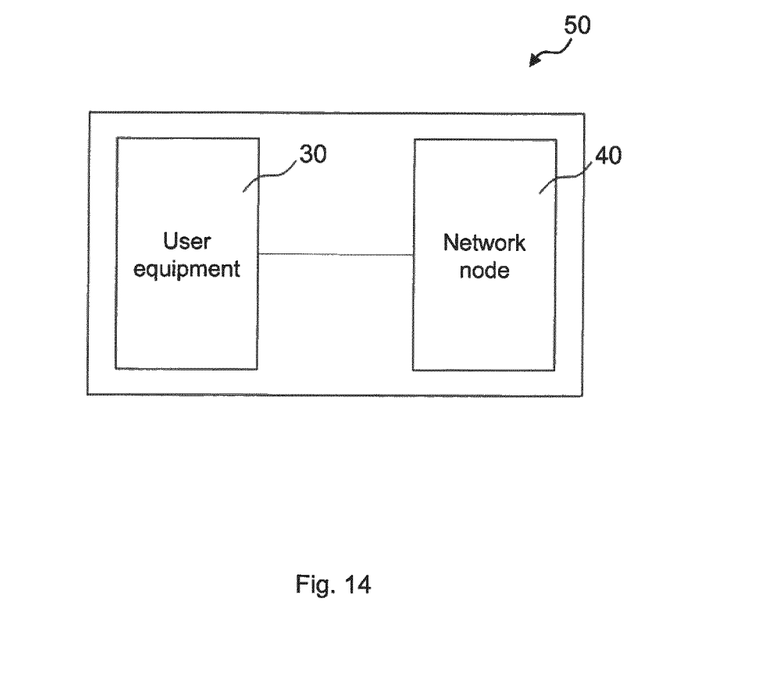
FIG. 14 is a schematic block diagram illustrating a system according to an embodiment.

FIG. 14 is a schematic block diagram illustrating a system 50 according to an embodiment.

In the embodiment of FIG. 14, the system 50 comprises a UE device 30 according to various embodiments set forth above, as well as a network node 40 according to various embodiments also set out in the foregoing.

Figure 15:
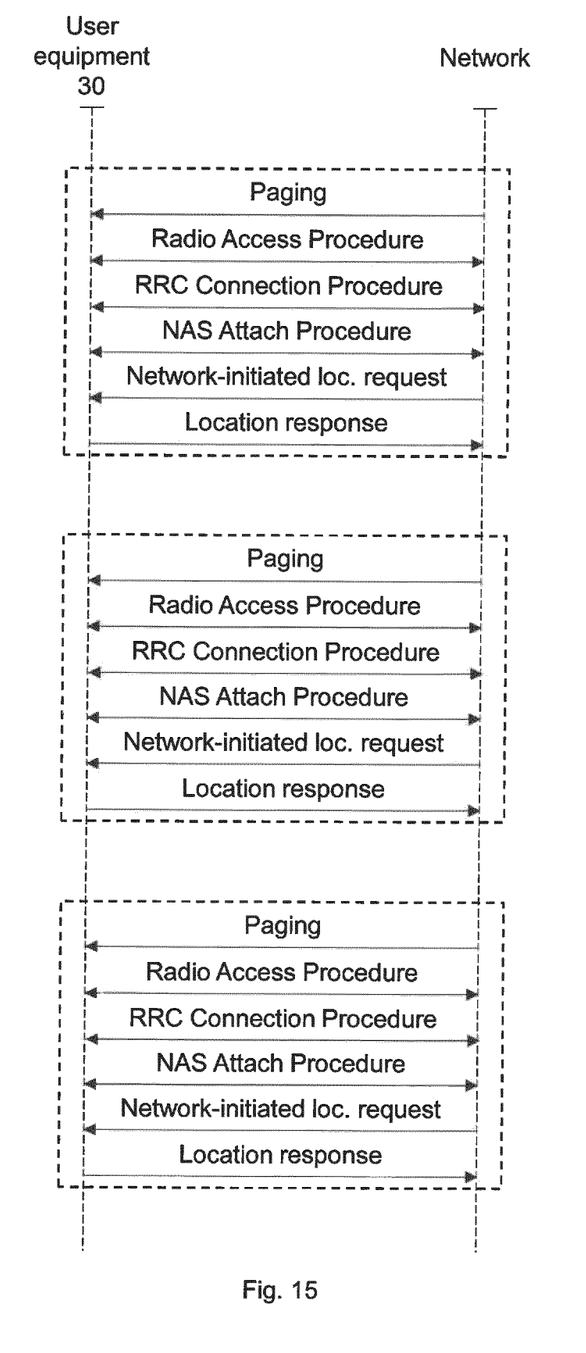
FIG. 15 is a schematic signaling diagram illustrating "Network-initiated positioning information transport" according to prior art.

FIG. 15 is a schematic signaling diagram illustrating "Network-initiated positioning information transport" according to prior art.

In the example of FIG. 15, each instance of a location reporting involves substantially the same sequence of control signals:

Initially, paging of the UE device 30 by the network, in particular by the MME node of the cellular network, is carried out within the relevant TA. For example, paging is initiated if there is some downlink data to be delivered to the UE device 30.

Then, the UE device 30 and the network undergo a Random Access procedure in order to synchronize with the network in the uplink direction.

Then, if the UE device 30 is not already attached to the network, it has to do so by initiating the NAS Attach procedure. Initiating any NAS procedure requires, in turn, the UE device 30 to establish an RRC Connection with the responsible base station beforehand, in order to request the resources required from the network for initiating the following NAS procedure.

Then, the UE device 30 initiates the NAS Attach procedure to establish a context for the UE device 30 in the MME node of the cellular network, as well as a default bearer having an IP address between the UE device 30 and the PDN gateway node of the cellular network.

Based on the obtained IP connectivity, the UE device 30 and the network, in particular the location server 40, may perform the core of the method known as "Network-initiated positioning information transport" using well-known LTE Positioning Protocol, LPP, signaling. For example, the location server 40 of the cellular network may request location information from the UE device 30, and the UE device 30 may respond by providing the requested location information.

As indicated in FIG. 15 by the repeating blocks of control signals, each individual location information query requires the full signaling described in the foregoing.

Figure 16:
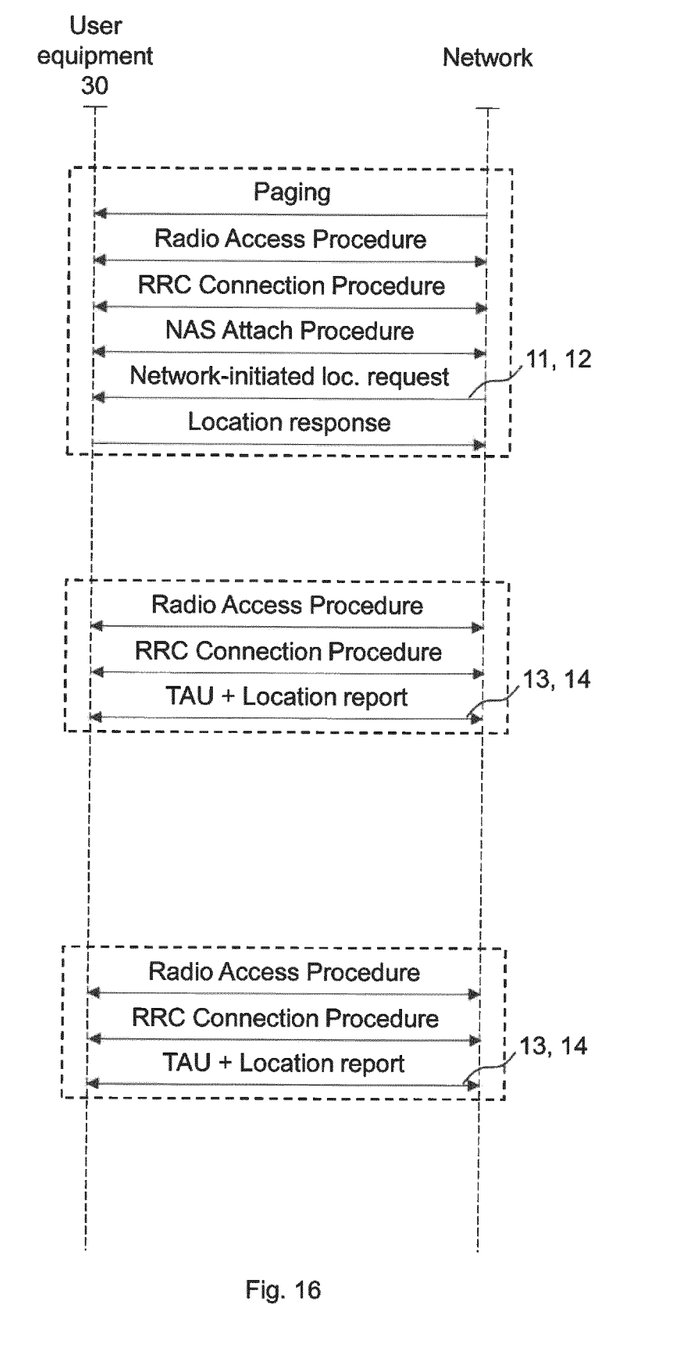
FIG. 16 is a schematic signaling diagram illustrating "Network-initiated positioning information transport" modified so as to perform the method according to embodiments.

FIG. 16 is a schematic signaling diagram illustrating "Network-initiated positioning information transport" modified so as to perform the method 10 according to various embodiments.

In the embodiment of FIG. 16, only the first instance of location reporting involves substantially the sequence of control signals known from the "Network-initiated positioning information transport" approach set out above.

In particular, as indicated by reference numerals 11 and 12, the request for location information is modified to involve communicating 11, from the network node 40 to the UE device 30, a first control signal 12 defining repetitive communicating 13 of a location information of the UE device 30 by the UE device 30.

While the initial location response may still be conveyed to the network based on known message interchange of the LPP protocol, subsequent control signals 14 comprising the location information of the UE device 30 are then delivered via a further network node 44 (not shown in FIG. 16), in particular the MME of the cellular network, which is involved in TAU procedures triggered by the UE device 30. The subsequent control signals 14 are included in third control signals 17 initiating the respective TAU procedure (see FIG. 8).

As a result, merely a minority of the sequence of control signals of the known "Network-initiated positioning information transport" approach needs to be retained, in particular the control signals relating to the Radio Access procedure and to the RRC Connection procedure.

While methods 10, devices 30, 40 and systems 50 according to various embodiments have been described, various modifications may be implemented in other embodiments. For illustration, the "Mobile-originated location request" approach according to prior art and indicated in the background section above may similarly be modified so as to perform the method 10 according to various embodiments. Besides, also signaling protocols in NR cellular networks or other radio access networks may be defined to perform the method 10 according to various embodiments.

The invention claimed is:

1. A method of keeping a cellular network informed of a location of a user equipment (UE) device, comprising communicating, from a network node of the cellular network to the UE device, a first control signal defining repetitive communicating of a location information of the UE device by the UE device, wherein, in the first control signal, there is one specification of resources to be used by the UE device for the repetitive communicating;

in response to the communicating, repetitively communicating using the specified resources, from the UE device to the network node, a second control signal comprising the location information of the UE device; and operating the UE device in a disconnected state in which a data connection between the UE device and the cellular network has been released, wherein the repetitive communicating is carried out while operating the UE device in the disconnected state.

2. The method of claim 1, wherein a respective communicating of the repetitive communicating is triggered by a trigger event of a respective tracking area update, TAU, procedure of a plurality of TAU procedures initiated by the UE device.

3. The method of claim 2, wherein the respective communicating is triggered by a trigger event of a respective TAU procedure of a subset of the plurality of TAU procedures initiated by the UE device.

4. The method claim 2, wherein the second control signal comprising the location information of the UE device is included in a third control signal initiating the respective TAU procedure.

5. The method of claim 1, wherein the repetitive communicating is carried out a predetermined number of times.

6. The method of claim 5, wherein the first control signal defining the repetitive communicating comprises the predetermined number of times.

7. The method of claim 1, wherein the repetitive communicating is carried out for a predetermined time period or up to a predetermined time instant.

8. The method of claim 7, wherein the first control signal defining the repetitive communicating comprises the predetermined time period or the predetermined time instant.

9. The method of claim 1, wherein the first control signal defining the repetitive communicating comprises reoccurring resources allocated to the UE device for the repetitive communicating.

10. The method of claim 1, wherein the communicating is carried out depending on a category of the UE device.

11. The method of claim 1, wherein the communicating is carried out depending on a subscription information relating to the UE device.

12. The method of claim 1, further comprising
initiating, by another network node of the cellular network different from the network node, the communicating.

13. The method of claim 1, further comprising
initiating, by the UE device, the communicating.

14. The method of claim 1, wherein the repetitively communicating comprises a plurality of respective repetitive communicating steps including the second control signal.

15. The method of claim 14, wherein the plurality of respective repetitive communicating steps includes the second control signal comprising a reduced sequence of control signals for subsequent reporting of location information from the UE device.

16. The method of claim 1, comprising:
in response to the communicating, repetitively communicating, from the UE device to the network node and via a further network node, the second control signal comprising the location information of the UE device.

17. The method of claim 1, wherein the disconnected state refers to an operational state in which the UE device is considered to be in a radio resource control (RRC) inactive state.

18. A user equipment (UE) device, comprising
a wireless interface;
a memory; and
a processor configured to keep a cellular network informed of a location of the UE device, including:
    receive, from a network node of the cellular network, a first control signal defining repetitive transmitting of a location information of the UE device by the UE device, wherein, in the first control signal, there is one specification of resources to be used by the UE device for the repetitive transmitting; and
    in response to the receiving, repetitively transmit using the specified resources, to the network node, a second control signal comprising the location information of the UE device, wherein the UE device is configured to repetitively transmit while operating in a connected state and in a disconnected state in which a data connection between the UE device and the cellular network has been released.

19. The user equipment (UE) device of claim 18, wherein the processor configured to repetitively transmit the second control signal comprising the location information of the UE device comprises transmitting a reduced sequence of control signals for subsequent reporting of the location information of the UE device.

20. A network node of a cellular network, comprising
a network interface;
a memory; and
a processor configured to keep the cellular network informed of a location of a user equipment (UE) device, including
    transmit, to the UE device, a first control signal defining repetitive transmitting of a location information of the UE device by the UE device, wherein, in the first control signal, there is one specification of resources to be used by the UE device for the repetitive transmitting; and
    in response to the transmitting, repetitively receive, from the UE device using the specified resources, a second control signal comprising the location information of the UE device, wherein the UE device is configured to repetitively transmit while operating in a connected state and in a disconnected state in which a data connection between the UE device and the cellular network has been released.

* * * * *